Nov. 16, 1954   G. N. BRUNKER   2,694,239
FLOATING WEATHER STRIP
Filed June 30, 1952

INVENTOR.
George N. Brunker,
BY Victor J. Evans & Co.
ATTORNEYS

United States Patent Office

2,694,239
Patented Nov. 16, 1954

2,694,239

FLOATING WEATHER STRIP

George N. Brunker, Salt Lake City, Utah

Application June 30, 1952, Serial No. 296,348

1 Claim. (Cl. 20—69)

This invention relates to improved weather stripping used primarily around doors, windows, and other closures, and in particular a continuous sealing strip floatingly mounted, of fibrous or other suitable material carried by a channel shaped backing member in a channel shaped housing and resiliently urged outwardly through a slot in the housing with springs secured to the backing member and positioned between the backing member and inner surface of the housing.

The purpose of this invention is to provide a weather strip wherein a sealing element is resiliently urged against a surface of a door or frame wherein in the closing movement of a device the sealing strip is actuated to compress resilient mounting elements.

In the conventional type of weather strip where a fibrous bead or tongue is positioned against the surface of a door or the like the fibrous member is stationary and with continuous use eventually wears or compresses so that it is necessary to move the mounting element in order to maintain a seal. With this thought in mind this invention contemplates a mounting element for a sealing strip in which resilient means is incorporated whereby the sealing strip is continuously urged against the surface of a door, window or the like.

The object of this invention is, therefore, to provide means for mounting a sealing strip whereby the sealing strip provides a floating element and whereby the floating element extends beyond the mounting means so that positive and continuous engagement thereof with a door or the like is assured.

Another object of the invention is to provide weather stripping having a floating sealing strip therein whereby the strip compensates for uneven surfaces and also for changes due to continually changing atmospheric conditions.

A further object of the invention is to provide an improved weather strip having a floating sealing strip therein in which the weather strip is of a simple and economical construction.

With these and other objects and advantages in view the invention embodies a substantially U-shaped housing having a slot in one end and a flange extended from one side thereof and a fibrous sealing strip mounted in a backing member with the edges of the backing member positioned to engage lips extended inwardly from the housing to prevent the sealing strip accidently separating from the housing, and springs positioned between the backing member and housing for resiliently urging the sealing strip outwardly, of the housing.

Other features and advantages of the invention will appear from the following description taken in connection with the drawing, wherein.

Figure 1:
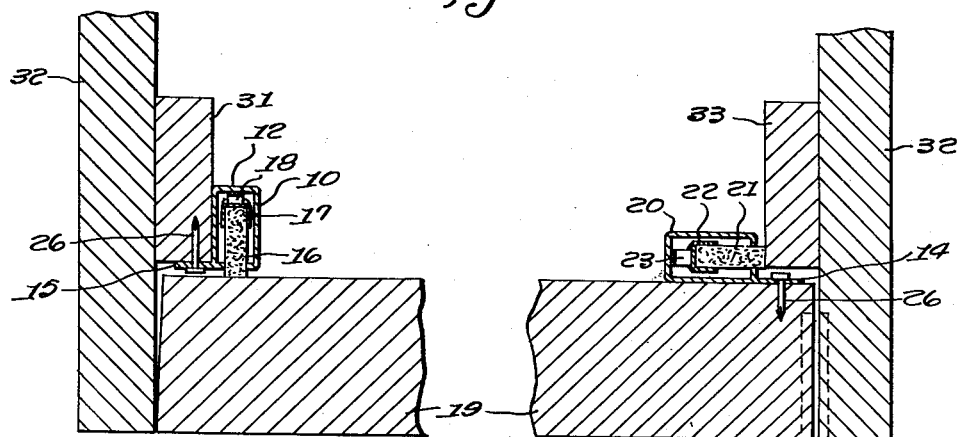
Figure 1 is a sectional plan through a door with part of the frame shown in combination therewith, illustrating the position of the improved weather stripping on the door and frame.

Referring now to the drawings wherein like reference characters denote corresponding parts the improved weather strip of this invention includes a substantially rectangular shaped housing having side walls 10 and 11, end walls 12 and 13 and a flange 14 which extends from one corner of the housing, a fibrous sealing strip 16, backing members 17, which are channel-shaped in cross section, and springs 18.

Figure 4:
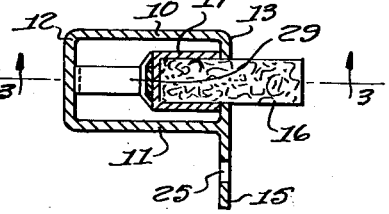
Fig. 4 is a cross section through the weather strip taken on line 4—4 of Fig. 3.

The flange 15 which is adapted to extend from one corner of the housing may be positioned in a plane parallel with the end wall 13, as shown in Fig. 4, or in a plane perpendicular to the end wall 13 and parallel to the side wall 11 as shown at the inside of a door 19 shown in Fig. 1, in which the housing is indicated by a numeral 20 the fibrous sealing strip by the numeral 21, the backing member by the numeral 22 and the springs by the numeral 23. In this design the flange is indicated by the numeral 14.

The flanges 15 or 14 are provided with openings 25 by which nails, screws, or other fastening elements may secure the housing in position on a door or door frame, as illustrated in Fig. 1, in which the housing is secured in position with brads or small nails, as indicated by the numeral 26.

Figure 5:
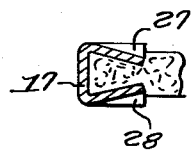
Fig. 5 is a detail showing a section taken on line 5—5 of Fig. 3 illustrating crimping sections spaced from the ends of backing members for securing the backing members to the fibrous strips.

The fibrous sealing strip 16 may be secured in the backing member by crimping the edges of sections 27 and 28 of side walls of the backing member inwardly, as shown in Fig. 5, the said crimped sections being spaced from the ends of the backing member.

Figure 3:
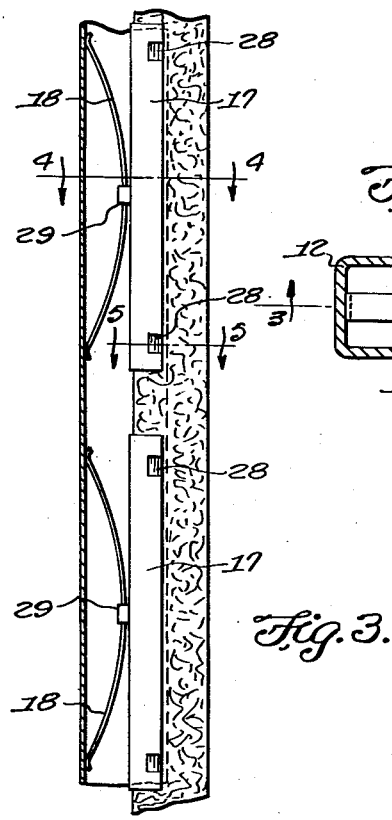
Fig. 3 is a vertical section through the improved weather strip taken on line 3—3 of Fig. 4.

Sections 29 of the backing members are also struck outwardly providing sockets for holding the springs 18, as shown in Figs. 3 and 4.

The end wall 13 of the weather strip housing is provided with a continuous slot 30 through which the fiber strip 13 extends and with the parts formed as illustrated in Fig. 4 the edges of the side walls of the backing member 17 limit outward movement of the sealing strip preventing accidental separation of the sealing strip from the housing.

As illustrated in Fig. 1 the housing, particularly as illustrated in Fig. 4 is mounted on a stop or parting strip 31 of a frame 32 and the sealing strip 16 is resiliently urged outwardly to engage the surface of a door 19 and as the door is closed the strip 16 is forced into the housing with the springs 18 compressed, as shown in Fig. 1. By this means the open side of the door, or the side on which the door handle and latch are positioned is sealed by engagement of the inner surface of the door with the floating sealing strip 16 and even though one end of the door may be spaced further from the strip 31 than the other the yielding elements in the weather strip compensate for the uneven position of the surface of the door providing a continuous seal throughout the length of the door.

At the opposite or hinged side of the door the weather strip is secured to the inner face of the door and the floating sealing strip 21 is positioned to engage a stop 33 on the door frame.

Figure 2:
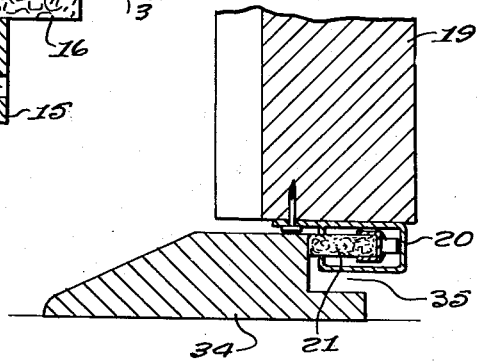
Figure 2 is a section through the lower end of the door showing the improved weather strip carried by the lower end of the door and positioned to coact with a threshold of a door for sealing the area at the bottom of a door.

In Fig. 2, which shows a section through the bottom of the door a housing strip, similar to the housing shown in the hinged side of the door in Fig. 1 is mounted on the lower end of the door and the threshold strip 34, positioned between the lower end of the door and floor is provided with a recess 35 into which the sealing strip 21 extends whereby a positive seal is provided at the bottom of the door.

The upper end of the door may be sealed with sealing strips such as the strips 16 or the strip 21 as may be desired.

The improved weather strip of this invention may, therefore, be positioned on a door or window sash or on the surrounding frame, as may be desired. In all positions the floating sealing strip compensates for uneven surfaces and also for changes in the relative positions of the parts due to changes in weather conditions.

It will be understood, that modifications within the scope of the appended claim may be made in the design and arrangement of the parts without departing from the spirit of the invention.

What is claimed is:

In a weather strip, a rectangular shaped housing including a pair of spaced parallel side walls, a first and second end wall extending between said side walls, said side walls being of greater length than said end walls, a flange extending from said housing and secured thereto, said flange being provided with a plurality of openings for the projection therethrough of securing elements, said second end wall being provided with a longitudinally extending slot, a fibrous sealing strip projecting through said slot and snugly engaging the adjacent portions of said second end wall, a plurality of backing members of U-shaped cross section positioned in said housing and each including a web and a pair of side sections, portions of said side sections being crimped inwardly into engagement with said sealing strip, the side sections of said backing members being arranged in spaced parallel relation with respect to the side walls of said housing, said slot being of less width than the space between said side sections whereby the free ends of said side sections abut the inner surface of said second end wall, said backing members having their ends spaced from each other, a curved spring member interposed between each backing member and said first end wall, each of said spring members including outer end portions arranged offset and engaging the inner surface of said first end wall, portions of the web of said backing member being struck outwardly to provide sockets, said spring members having their intermediate portions arranged in engagement with said sockets, said spring members having substantially the same length as said backing members.

References Cited in the file of this patent

UNITED STATES PATENTS

| Number | Name | Date |
|---|---|---|
| 148,583 | Tuttle | Mar. 17, 1874 |
| 746,910 | Zimmerman | Dec. 15, 1903 |
| 1,649,070 | Lerch | Nov. 15, 1927 |
| 2,496,084 | Casperson | Jan. 31, 1950 |